F. G. Johnson,
Wind Wheel,
Nº 27,758. Patented Apr. 3, 1860.
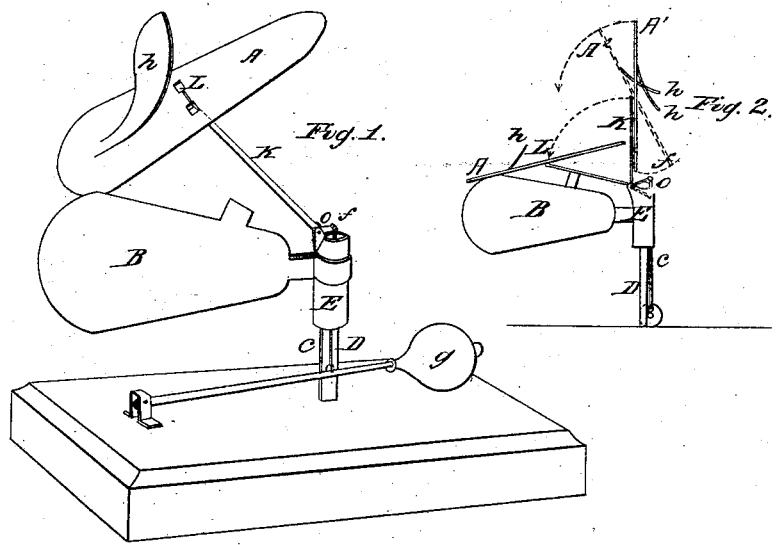
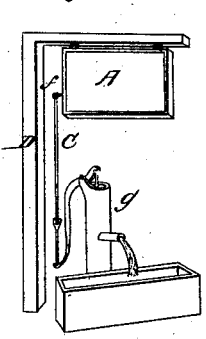
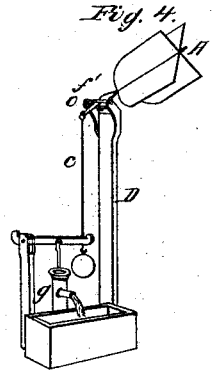
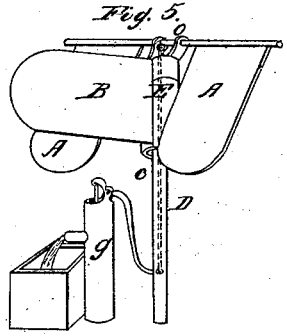
Witnesses
Inventor
Frank G. Johnson

UNITED STATES PATENT OFFICE.

FRANK G. JOHNSON, OF BELLWOOD, SAG HARBOR, NEW YORK, ASSIGNOR TO HIMSELF AND DANIEL F. TOMPKINS, OF NEWARK, NEW JERSEY.

IMPROVED WIND-MACHINE FOR PUMPING WATER.

Specification forming part of Letters Patent No. 27,758, dated April 3, 1860.

*To all whom it may concern:*

Be it known that I, FRANK G. JOHNSON, of Bellwood, Sag Harbor, in the county of Suffolk and State of New York, have invented a new and useful Wind-Machine for Pumping Water and for other Purposes, which I have denominated the "Aerio" (aeipu) or lifter; and I do hereby declare that the following is a full, clear, and exact description of the same, reference being had to the accompanying drawings, making part of this specification, in which—

Figure 1 is a perspective view; Fig. 2, a perpendicular section of the same, and Figs. 3, 4, and 5 are introduced to illustrate more fully the objects of my invention and the practical operation of the same.

The same letters indicate like parts in all the figures.

In Figs. 1 and 2, A is a frame, of canvas, wood, or metal, which, when the machine is at rest, is held by means of the weight $g$, Fig. 1, in a perpendicular position, as shown by the line A', Fig. 2, and is turned to face the wind by means of the wind-vane B, attached to the cylinder or collar E, Figs. 1 and 2. E is supported and adjusted free to turn, as the wind changes, upon the post D.

K is a rod adjusted upon bearings at $f$, and has an arm $c$ projecting from its lower end, which is connected to the pump-rod $c$. A is hinged at its center to the outer end of K, as represented, and is free to change its position, as shown in the figures.

$h$ is an angular projection or disk from A, as represented, and is introduced to facilitate the workings of the machine, as hereinafter described.

The operations of my machine are as follows: The pressure of the wind will force back the frame A, carrying with it the rod K, and by means of the connecting-rod $c$ elevating the weight $g$ or its equivalent—the handle or the piston-rod of the pump—until K reaches the position shown at $A^2$, Fig. 2, when the angular projection or disk $h$ is caught by the wind and the upper part of A will then overbalance the lower part and A will turn on its bearing at L and assume the position represented in Fig. 1. The whole of A is then edgewise to the wind, with the exception of the projection $h$; but the downward tendency of the weight $g$, together with the action of the wind on the lower side of A, will overcome the pressure of the wind on $h$ and A will be thrown forward instantly into the perpendicular position and ready for the repetition of the same motions. The action of A to and fro in the manner just described will produce a reciprocating motion up and down of $g$. If, now, a pump rod or crank is attached to $g$, or its equivalent, water may be elevated or a rotating motion obtained, thus affording a very cheap device for wind-power for any mechanical purpose to which it is applicable.

In Fig. 3 the main principle of my invention is shown disconnected and separate from all its surroundings, and is simply the attaching, by means of the rod $c$, of the handle or piston of a pump to a swinging sign-board, which as it swings in the wind will work the pump.

In Fig. 4 is shown another arrangement substantially the same as that of the sign-board and consists of the transverse wind-surfaces A, adjusted upon a universal joint at $f$ in such a manner as that it will give way before the pressure of the wind and so elevate the lever of the pump, and when the force of the wind diminishes the weight on the lever brings A into the perpendicular position, ready for the next action.

In Fig. 5 is shown the same main principle and also being a combination of the sign-board, Fig. 3, and the vane B, Fig. 1.

What I claim as new and of my own invention, and desire to secure by Letters Patent of the United States, is—

The wind-surface A $h$, in combination with the vane B, connecting-arm K $f$, rod $c$, and weight $g$, the whole constructed and operated in the manner and for the purposes set forth.

FRANK G. JOHNSON.

Witnesses:
I. W. NICKERSON,
JAMES WINTERS.